United States Patent [19]
Machi et al.

[11] 3,941,671
[45] Mar. 2, 1976

[54] STABLE DISPERSION OF HIGH MOLECULAR WEIGHT POLYTETRAFLUOROETHYLENE CONTAINING NO ADDITIVES AND A PROCESS FOR THE PRODUCTION THEREOF

[75] Inventors: Sueo Machi; Takeshi Suwa; Masaaki Takehisa; Tadao Seguchi, all of Takasaki, Japan

[73] Assignee: Japan Atomic Energy Research Institute, Tokyo, Japan

[22] Filed: Feb. 22, 1974

[21] Appl. No.: 444,768

[30] Foreign Application Priority Data
Feb. 23, 1973 Japan.................................. 48-21357

[52] U.S. Cl. ... 204/159.22; 260/29.6 F; 260/92.1 R
[51] Int. Cl.² .......................................... C08F 2/46
[58] Field of Search.................. 260/29.6 F, 92.1 R; 204/159.22

[56] References Cited
UNITED STATES PATENTS

| | | | |
|---|---|---|---|
| 2,559,752 | 7/1951 | Berry ............................ | 204/159.22 |
| 3,704,285 | 11/1972 | Porter ........................... | 260/92.1 R |
| 3,707,519 | 12/1972 | Hahn............................. | 260/92.1 R |
| 3,723,270 | 3/1973 | Tabata et al................... | 260/92.1 R |

*Primary Examiner*—Eugene C. Rzucidlo
*Attorney, Agent, or Firm*—Browdy and Neimark

[57] ABSTRACT

A stable aqueous dispersion of unexpectedly high molecular weight polytetrafluoroethylene, containing no additives such as dispersing and emulsifying agents, is prepared by radiation-polymerizating tetrafluoroethylene monomer in an aqueous phase in the absence of dispersing or emulsifying agent.

7 Claims, 1 Drawing Figure

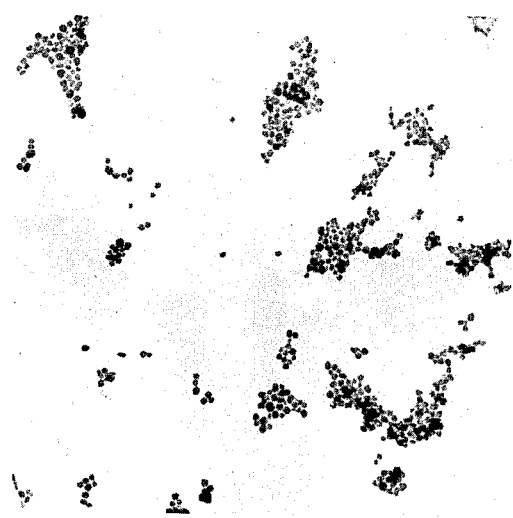

з,941,671

STABLE DISPERSION OF HIGH MOLECULAR WEIGHT POLYTETRAFLUOROETHYLENE CONTAINING NO ADDITIVES AND A PROCESS FOR THE PRODUCTION THEREOF

FIELD OF INVENTION

This invention relates to a process for the production of an aqueous dispersion of polytetrafluoroethylene. More particularly, the invention relates to a process for the production of a very stable aqueous dispersion of high purity polytetrafluoroethylene having exceptionally high molecular weight, which can be carried out by means of irradiation without using any dispersing or emulsifying agent.

BACKGROUND OF THE INVENTION

A dispersion of polytetrafluoroethylene is industrially produced by the polymerization of tetrafluoroethylene monomer dispersed in an aqueous phase either in the form of emulsion or suspension in the presence of an emulsifying or a dispersing agent, using free radical-generators as catalysts. It is also known that said process can be carried out by initiating the polymerization with ionizing radiation instead of using free radical-generators in the presence of either emulsifying or dispersing agent. Radiation-initiated polymerization is convenient, because it is easier to control the reaction. However, according to the present inventors' detailed studies, the molecular weights of the polymers obtained by said radiation-initiated polymerizations were at most 1,000,000 or so, and this is remarkably low compared with those of the polymers obtained by the free radical polymerizations. Accordingly, the molded articles obtained from the polymers obtained by radiation-initiated polymerization have defects in that their mechanical strength is low, which is very disadvantageous from a practical viewpoint. Experiments to increase the molecular weights of such polymers by applying the "post-irradiation polymerization method" thereto have been made, but, without success.

SUMMARY OF THE INVENTION

Therefore, the present inventors studied carefully and carried out many experiments to find out why polymers with high molecular weights cannot be obtained by said radiation polymerization processes. The experimental results suggested that the decomposition products resulting from the radiolysis of dispersing or emulsifying agents acted as "chain-transfer agents" in the polymerization reaction of tetrafluoroethylene, thereby limiting the degree of polymerization to a certain low level. So, the present inventors conducted experiments in which said radiation polymerization was effected without the use of such dispersing or emulsifying agents, and they were able to obtain a dispersion of polytetrafluoroethylene having very high molecular weight. It is natural, however, that if necessary the molecular weight of polytetrafluoroethylene can be controlled to a certain low level by stopping the polymerization at a proper period, raising the temperature or lowering the pressure. Thus, it will be understood that according to the process of the present invention, an aqueous dispersion of pure polytetrafluoroethylene having the molecular weight in the region of $5 \times 10^5 \sim 3 \times 10^7$ can be obtained. Further, the aqueous dispersion thus obtained was very stable and also, the polymerization ratios were almost equal to those in cases in which dispersing or emulsifying agents were present. The features of the polymerization observed and the properties of the polymers produced when no additives were used were to some extent analogous to those of the radiation polymerization of ethylene in emulsion, and were quite different from the features and properties of the polymerization products obtained by the radiation polymerization of ethylene in an aqueous phase in the absence of emulsifying or dispersing agents. Thus, it is assumed that these features and properties are inherent in tetrafluoroethylene and its polymer.

According to the present invention, a process is provided for the production of a stable aqueous dispersion of polytetrafluoroethylene of high purity having high molecular weight, which does not contain even the slightest fraction of such additives as catalyst or dispersing or emulsifying agent.

DETAILED DESCRIPTION OF THE INVENTION

In the practice of the present invention, the polymerization is initiated by means of ionizing radiations. The term "ionizing radiations" herein used includes alpha-rays, beta-rays, gamma-rays, X-rays, electron beams, neutron beams, proton beams and the like.

According to the process of the present invention, tetrafluoroethylene monomer, preferably 3-50 parts by weight, is put into 100 parts by weight of an aqueous medium containing no dispersing or emulsifying agent. The suspension thus obtained is subjected to ionizing radiations, while the suspension is continuously agitated. Through such simple procedures as mentioned above, a stable aqueous dispersion of polytetrafluoroethylene with satisfactory properties can be obtained.

In the practice of the present invention, irradiation is conveniently carried out at temperatures ranging from 0° to 100° C, preferably at temperatures ranging from 20° to 100° C, and under pressures ranging from about atmospheric pressure, e.g. 1 kg/cm$^2$, to about 50 kg/cm$^2$, preferably from 10 to 40 kg/cm$^2$.

Dose-rates are not restricted to a specific range, but it is convenient to use a dose-rate above about $1 \times 10^4$ R/hr in order to obtain an industrially practicable polymerization rate. However, if the dose is too high, it may lead to violent reactions. Thus, the selection of proper dose-rate is essential. In general, dose-rate ranging from about $1 \times 10^4$ R/hr to $1 \times 10^6$ R/hr is used. The dose-rates ranging from $1 \times 10^4$ to $1 \times 10^5$ R/hr are preferable.

The total dose required to obtain satisfactory results in the practice of the present invention is in the region of $1 \times 10^3$ R to $2 \times 10^5$ R.

In the practice of the present invention, about 0.5% by weight or more, about 0.5 to about 2.0%, based on the amount of water, of one or more of liquid hydrocarbons such as, for example, hexane, cyclohexane, dodecane, hexadecane, paraffin wax and the like are preferably added to the reaction system in order to avoid bulk polymerization of tetrafluoroethylene which may occur in gas phase.

In the polymerization of the present invention, as in the radiation polymerization using emulsifying or dispersing agents, the so-called "post-irradiation polymerization" is observed. Namely, the polymerization proceeds after stopping the irradiation. This post-irradiation polymerization increases further the molecular weights of the produced polymers.

In the practice of the present invention, every trace of oxygen must be removed from the reaction system before starting, because the presence of any oxygen remarkably checks the progress of polymerization.

The particles of the polymer obtained by the process of the present invention are very small, and the range of particle size distribution is narrow. Electron microscope observation shows the particle size to be in the region of 0.05 ~ 0.3 $\mu$ (microns), and this is believed to account for the high stability of the aqueous dispersion of the present invention.

FIG. 1 shows an electron microscopic photograph of an aqueous dispersion of polytetrafluoroethylene obtained by the process of the present invention.

When the polymerization process of the present invention is carried out through a batch process, an aqueous dispersion having a polymer content in the region of 10% by weight or so is obtained. However, if the polymerization is carried out through a semi-continuous process in which tetrafluoroethylene is continuously fed, a dispersion having higher polymer content can be obtained.

The following examples will serve to illustrate the present invention but are not intended to restrict the scope of the invention.

EXAMPLE 1

In a pressure-resisting 200 ml capacity stainless steel reactor equipped with an agitator, 1.5 g of hexadecane was placed, and the reactor was evacuated by means of a vacuum pump. Then, high purity nitrogen gas was introduced into the reactor, and the nitrogen in the reactor was replaced with nitrogen gas with pressure. This replacement procedure was repeated five times. Then, the last charge of nitrogen was replaced with tetrafluoroethylene. This first charge of tetrafluoroethylene was replaced with a second charge of tetrafluoroethylene. This replacement was repeated five times. Then, 28 g of tetrafluoroethylene monomer was put into the reactor and 150 ml of distilled water, which had beforehand been deoxygenated with nitrogen, was introduced into the reactor under pressure applied by using a plunger pump. The reactor containing the above mentioned materials was kept at 70°C and was subjected to gamma-rays at a dose rate of $2 \times 10^4$ R/hr, with agitation given by an agitator rotating at 800 r.p.m. After an hour and a half irradiation, as polymerization progressed, pressure within the reactor decreased from the original pressure of 38 kg/cm² to 18 kg/cm². Hereupon, the polymerization was terminated by purging the unreacted tetrafluoroethylene and the reaction product was taken out. The product was a milk-white aqeous dispersion which was highly stable and contained 50 g/l of the produced polymer. A portion of the produced dispersion was observed through an electron microscope, and the pattern observed is shown in FIG. 1. As is seen from FIG. 1, particles of polytetrafluoroethylene having an average diameter in the region of about 0.1 ~ about 0.2 microns are dispersed in the aqueous medium. The molecular weight of the polymer thus obtained, which was determined by a conventional S.S.G. (standard specific gravity) method, turned out to be, astonishingly, as high as in the region of about 20,000,000 or so.

To compare with the above example, irradiation polymerization was effected according to the same procedures and conditions as those in the above example, except that 0.75 g of an ammonium salt of perfluoroctanoic acid, in an amount of 0.5% by weight based on the amount of water, was added as an emulsifying agent. As a result, an aqueous dispersion containing 29 g/l of the polymer was obtained. The molecular weight of the polymer thus obtained, as determined by the same procedure as mentioned above, was 800,000, which was remarkably small as compared with that of the polymer obtained in the first example.

It is obvious from the above two examples that the molecular weight of the polymer contained the dispersion of polytetrafluoroethylene obtained by the process of the present invention using no emulsifying or dispersing agents is remarkably high, and that the polymer content of the dispersion is higher than in the case of prior art in which an emulsifying agent or a dispersing agent is used.

EXAMPLE 2

Irradiation polymerization was carried out under the same conditions as those in Example 1 except that the temperature was set at 25°C, irradiation time was 1 hour and the initial pressure in the reactor was 30 kg/cm². When polymerization was finished, the pressure was found to have been lowered from the initial pressure of 30 kg/cm² to 16.5 kg/cm². The dispersion obtained appeared milk-white as in Example 1 and contained 6.3 g/l of the polymer. The molecular weight of the polymer, which was determined as in Example 1, was 1,750,000.

To compare with the above Example 2, irradiation polymerization was carried out under the same conditions except that 0.75 g of an ammonium salt of perfluoroctanoic acid was added to the initial system as an emulsifying agent. The aqueous dispersion obtained contained 40 g/l of polymer with a molecular weight of 470,000.

It is obvious from the above two examples that according to the process of the present invention, the aqueous dispersion produced has a higher polymer content and the polymer has higher molecular weight than the dispersion obtained by the prior art process.

EXAMPLE 3

Irradiation polymerization was carried out under the same conditions as in Example 1 except that the temperature was 25°C, the dose rate was $3.7 \times 10^4$ R/hr and the initial pressure was 28 kg/cm². As the reaction progressed, the pressure decreased from the initial 28 kg/cm² to 7 kg/cm². The resulting dispersion of the polymer was milk-white as in Example 1 and contained 75.3 g/l of the polymer product. The molecular weight of the polymer product, as determined according to the same procedure as in Example 1, was 2,700,000.

In order to compare with the result of the above Example 3, irradiation polymerization was carried out under the same conditions as those in Example 3 except that 0.75 g of an ammonium salt of perfluoroctanoic acid was added to the initial system as an emulsifying agent. An emulsion containing 43 g/l of the polymer was obtained. The molecular weight of the polymer product was 200,000. It is obvious from the above two examples, that the dispersion obtained by the present invention had a higher polymer content and that the polymer had remarkably higher molecular weight than the polymer product in the dispersion of the prior art.

EXAMPLE 4

Into the same reactor as used in Example 1, 2.0 g of hexadecane and 20 g of tetrafluoroethylene were placed according to the same procedure as in Example 1. Then, 150 ml of distilled water was introduced into the reactor under pressure.

A feed line for tetrafluoroethylene supply was kept connected to the reactor, and the materials in the reactor were irradiated with gamma-rays at a dose rate of $2 \times 10^4$ R/hr with agitation provided by an agitator rotating at the rate of 800 r.p.m., after the temperature had been raised to 70°C.

During the polymerization, the pressure of the system was kept almost constant at 38 kg/cm$^2$. The particular difference between this Example 4 and Example 1 was that in the former tetrafluoroethylene was continuously applied through said feeding line in order to replace the monomer consumed as a result of polymerization, thereby keeping the pressure of the reaction system at a constant value of about 38 kg/cm$^2$. After an hour and a half irradiation, unsaturated tetrafluoroethylene monomer was purged from the reaction system and the reaction product was taken out. The product was a stable, milk-white aqueous dispersion containing 120 g/l of the produced polymer. The molecular weight of the produced polymer was determined to be 27,000,000.

EXAMPLE 5

Simultaneous irradiation-induced polymerization was carried out in the same manner as in Example 2, and after termination of the polymerization, tetrafluoroethylene was introduced into the reactor until the pressure became 20 kg/cm$^2$, without opening the reactor. The reaction system was kept at 25°C for 4 hours, continuously replacing tetrafluoroethylene monomer consumed during the polymerization in order to keep the pressure of the reaction system at about 20 kg/cm$^2$. When this reaction system was irradiated again, after-effect polymerization was observed. The final reaction product was a stable dispersion which was milk-white and contained 110 g/l of the produced polymer having the mean molecular weight of 3,000,000.

By comparing the above result with that of Example 2, it is seen that yield and the molecular weight of the polymer further increase as a result of post-irradiation polymerization which occurs after the additional irradiation.

EXAMPLE 6

Irradiation polymerization was carried out in the same manner as in Example 4, except that the pressure of the reaction system was 10 kg/cm$^2$, the reaction temperature was 25°C and irradiation time was 5 hours. A milk-white, stabe dispersion was obtained. The dispersion contained 82 g/l of the polymer of which molecular weight was 155,000.

Although the invention has been described in considerable detail with reference to certain preferred embodiments thereof, it will be understood that variations and modifications can be effected without departing from the spirit and scope of the invention as described hereinabove and as defined in the appended claims.

What we claim is:

1. A process for the production of a stable aqueous dispersion of high molecular weight polytetrafluoroethylene of molecular weight in the range of $5 \times 10^5$ to $3 \times 10^7$ and of average particle size of 0.05 to 0.3 microns, which comprises polymerizing while agitating in the substantial absence of oxygen tetrafluoroethylene monomer present in an amount of 3–50 parts by weight in 100 parts by weight of an aqueous medium by irradiation with ionizing radiation at 0–100°C and a pressure of about atmospheric to 50 kg/cm$^2$ in the absence of dispersing or emulsifying agents, the irradiation dose rate being greater than $1 \times 10^4$ R/hr. and less than that dose rate leading to a violent reaction, and the total dose being in the region of $1 \times$ to $10^3$ to $2 \times 10^5$ R.

2. A process for the production of a stable aqueous dispersion of high molecular weight polytetrafluoroethylene of molecular weight in the range of $5 \times 10^5$ to $3 \times 10^7$ and of average diameter particle size of 0.05 to 0.3 microns, which comprises charging 3–50 parts by weight of tetrafluoroethylene monomer into 100 parts by weight of an aqueous medium containing neither a dispersing nor an emulsifying agent, continuously agitating the resulting mixture, and irradiating the mixture with ionizing radiation selected from the group consisting of alpha-rays, beta-rays, gamma-rays, X-rays, electron beams and proton beams, at a dose rate of about $1 \times 10^4$ R/hr or more for a total dose of $1 \times 10^3$ R to $2 \times 10^5$ R, at a temperature of 0–100°C and a pressure of 1 to 50 kg/cm$^2$ and in the substantial absence of oxygen.

3. The process of claim 1 in which a liquid hydrocarbon in an amount of from about 0.5 to about 2.0% by weight of the weight of water is added to the aqueous system before irradiation.

4. The process of claim 3 in which said liquid hydrocarbon is one selected from the group consisting of hexane, cyclohexane, dodecane, hexadecane and paraffin wax.

5. A process in accordance with claim 2 wherein said temperature is 20° to 100°C and said pressure is 10 to 40 kg/cm$^2$.

6. A process in accordance with claim 2 wherein said radiation dose rate is from $1 \times 10^4$ to $1 \times 10^5$ R/hr.

7. A stable aqueous dispersion of pure and high molecular weight polytetrafluoroethylene made by the process of claims 2 and having a molecular weight in the range of $5 \times 10^5$ to $3 \times 10^7$, the average diameter of the particles of said polymer being in the region of 0.05–0.3 microns, said particles being dispersed in substantially pure water which contains neither dispersing nor emulsifying agent.

* * * * *